United States Patent
Daigle et al.

(10) Patent No.: US 9,243,342 B2
(45) Date of Patent: Jan. 26, 2016

(54) METAL CLEANING AND DEPOSITION PROCESS FOR COILED TUBING USING ELECTRO PLASMA

(71) Applicant: CAP Technologies, LLC, Denham Springs, LA (US)

(72) Inventors: Edward O. Daigle, Baton Rouge, LA (US); Pratheesh George, Baton Rouge, LA (US)

(73) Assignee: CAP Technologies, LLC, Denham Springs, LA (US)

( * ) Notice: Subject to any disclaimer, the term of this patent is extended or adjusted under 35 U.S.C. 154(b) by 19 days.

(21) Appl. No.: 14/455,875

(22) Filed: Aug. 9, 2014

(65) Prior Publication Data
US 2015/0040375 A1 Feb. 12, 2015

Related U.S. Application Data

(60) Provisional application No. 61/864,282, filed on Aug. 9, 2013.

(51) Int. Cl.
| | |
|---|---|
| *B21C 37/08* | (2006.01) |
| *C25D 5/22* | (2006.01) |
| *B21C 37/09* | (2006.01) |

(Continued)

(52) U.S. Cl.
CPC .............. *C25D 5/22* (2013.01); *B21C 37/0811* (2013.01); *B21C 37/09* (2013.01); *B21C 43/00* (2013.01); *B21C 47/02* (2013.01); *C25D 5/003* (2013.01); *F16L 9/02* (2013.01); *B21C 37/083* (2013.01); *B23K 2201/06* (2013.01); *C25D 5/36* (2013.01); *C25D 5/48* (2013.01); *C25F 1/04* (2013.01); *Y10T 29/49885* (2015.01); *Y10T 29/49968* (2015.01); *Y10T 29/49982* (2015.01)

(58) Field of Classification Search
CPC .. B23K 9/0253; B23K 13/025; B23K 13/027; B23K 2201/06; Y10T 29/49885; Y10T 29/49968; C25D 5/003; C25D 7/0642; C25D 5/36; C25D 5/48; C25D 11/026; C25F 1/04; B21C 37/09; B21C 37/0811; B21C 37/08; B21C 37/083
See application file for complete search history.

(56) References Cited

U.S. PATENT DOCUMENTS

| | | | |
|---|---|---|---|
| 4,360,410 A | 11/1982 | Fletcher | |
| 5,035,042 A * | 7/1991 | Maitra | B21C 37/09 228/147 |

(Continued)

FOREIGN PATENT DOCUMENTS

| | | | |
|---|---|---|---|
| WO | WO 9735051 | 9/1997 | |
| WO | WO 9735051 A1 * | 9/1997 | C25D 5/08 |

*Primary Examiner* — Jermie Cozart
(74) *Attorney, Agent, or Firm* — Warner J. Delauner; Baker Donelson, et al.

(57) ABSTRACT

A method for creating an improved coiled tubing is provided, comprising cleaning a sheet metal workpiece using an electroplasma process to remove oxide scale and other contaminants on surfaces of the workpiece; applying a first metal coating to the workpiece using the electroplasma process; forming the sheet metal workpiece into a tube having abutting edges to form a seam; welding the seam to complete the formation of the tube; grinding the seam to establish a smooth exterior surface on the seam; applying a second metal coating to the seam of the tube using the electroplasma process; and coiling the tube around a spool.

2 Claims, 4 Drawing Sheets

(51) Int. Cl.
  B21C 47/02 (2006.01)
  C25D 5/00 (2006.01)
  F16L 9/02 (2006.01)
  B21C 43/00 (2006.01)
  C25D 5/36 (2006.01)
  C25D 5/48 (2006.01)
  C25F 1/04 (2006.01)
  B21C 37/083 (2006.01)

(56) References Cited

U.S. PATENT DOCUMENTS 5,700,366 A 12/1997 Riabkov
5,958,604 A 9/1999 Riabkov
5,981,084 A 11/1999 Riabkov
6,585,875 B1 7/2003 Ryabkov

* cited by examiner

REACTOR VIEWS
Typical for Most Processing, Pipe, Rebar, Wire-Rod, Wire, Strip
Physical Size of Workpiece Determines Reactor Size

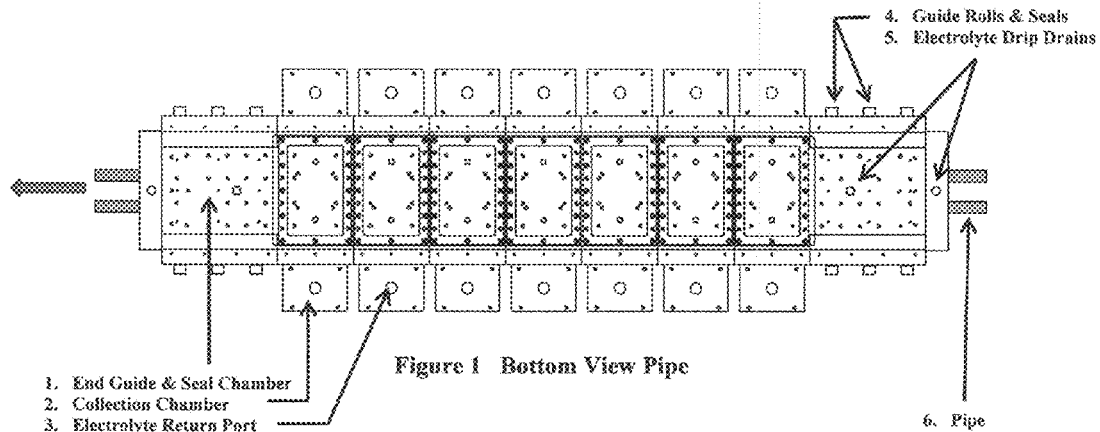

4. Guide Rolls & Seals
5. Electrolyte Drip Drains

1. End Guide & Seal Chamber
2. Collection Chamber
3. Electrolyte Return Port

6. Pipe
7. Strip

Figure 1  Bottom View Pipe

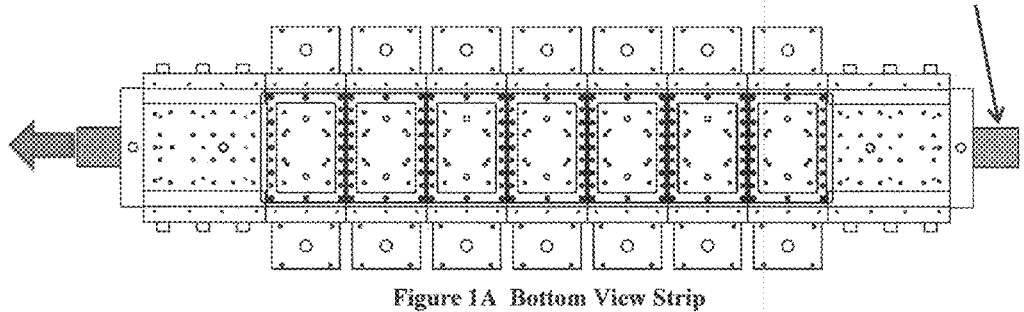

Figure 1A  Bottom View Strip

8. Vapor Vent to Condenser
9. Wire Rod, Wire, Tube, Rebar

10. Reaction Chamber

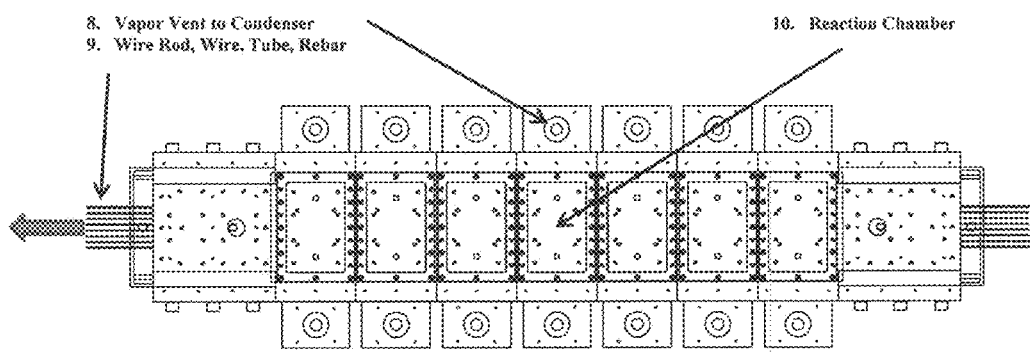

Figure 2  Top View Wire Rod, Rebar, Tube

REACTOR VIEWS
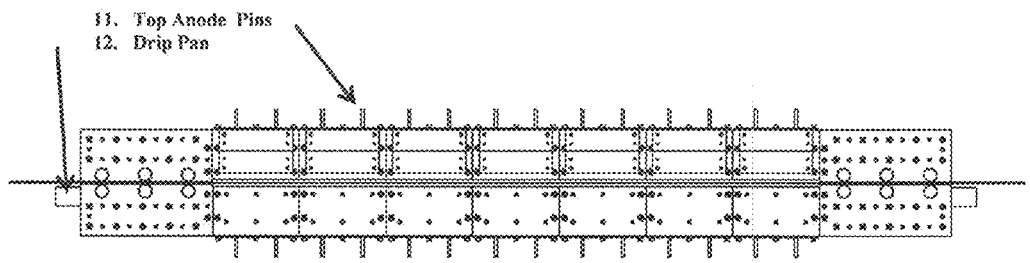
11. Top Anode Pins
12. Drip Pan
Figure 3  Side View All Products
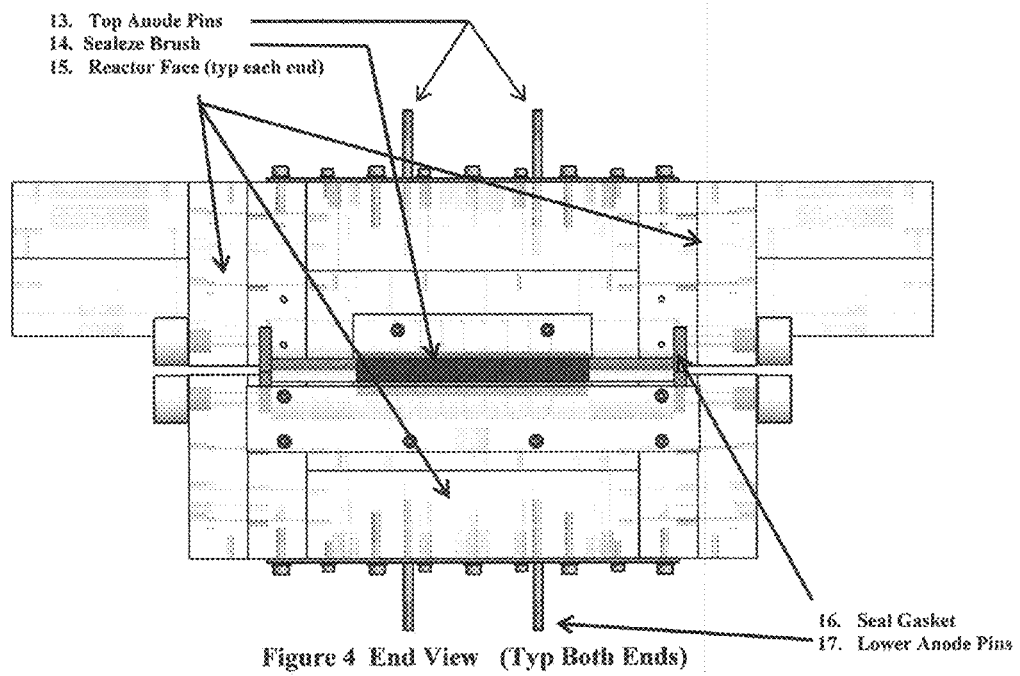
13. Top Anode Pins
14. Sealeze Brush
15. Reactor Face (typ each end)
16. Seal Gasket
17. Lower Anode Pins
Figure 4  End View  (Typ Both Ends)

REACTOR VIEWS
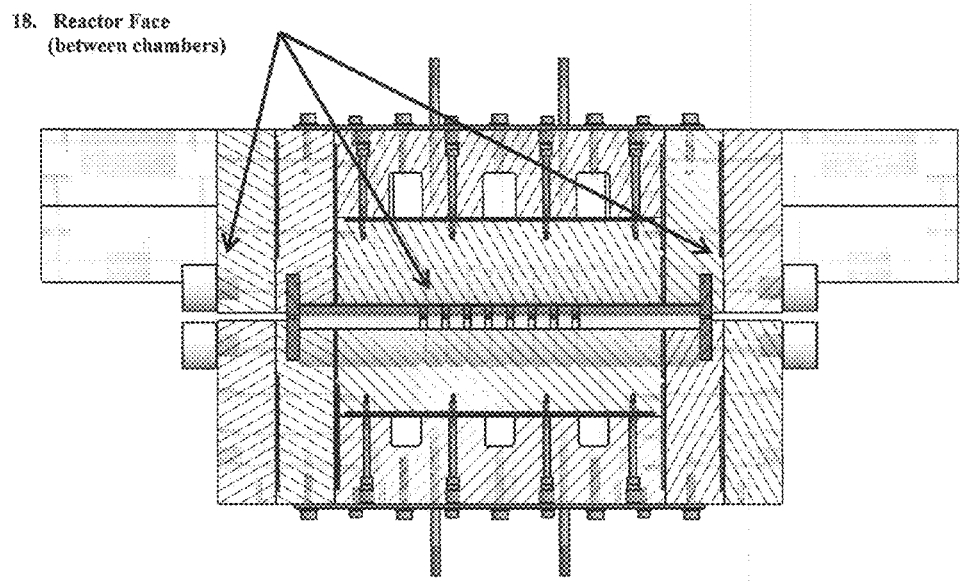
Figure 5 Cross Section Between Reaction Chamber
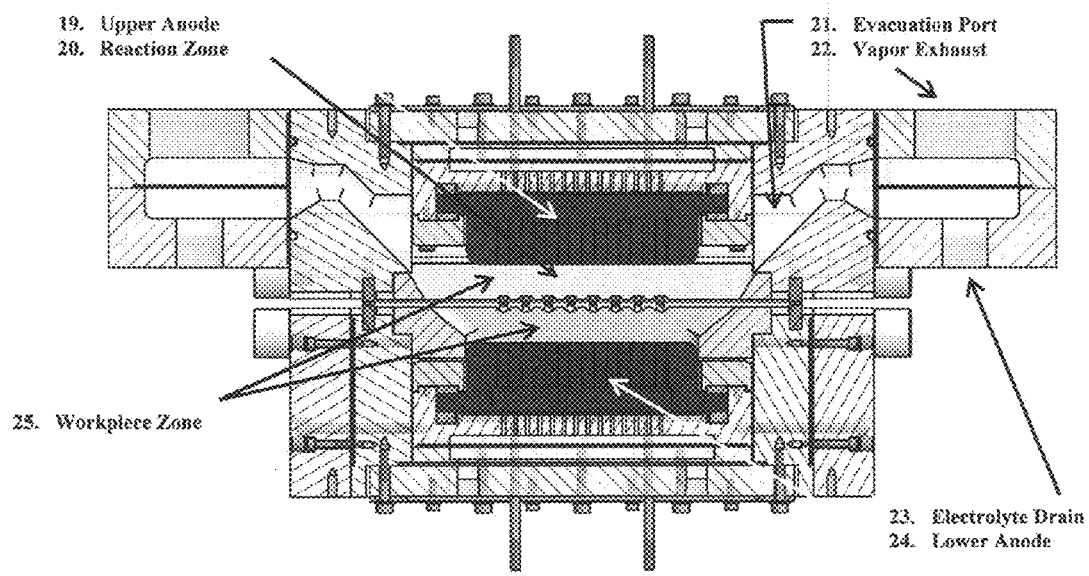
Figure 6 Cross Section Within Reaction Chamber

METAL CLEANING AND DEPOSITION PROCESS FOR COILED TUBING USING ELECTRO PLASMA

CROSS-REFERENCE TO RELATED APPLICATIONS

This nonprovisional application claims the benefit of priority to U.S. provisional application, Ser. No. 61/864,282, filed on Aug. 9, 2013.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON COMPACT DISC

Not applicable.

BACKGROUND OF THE INVENTION

1. Field of the Invention

The present invention relates to cleaning and coating of coiled tubing, and more particularly to such processes which use electro plasma.

2. Description of Related Art

In the oil and gas industries, coiled tubing refers to metal piping, normally 0.75" to 4.25" in diameter, used for interventions in oil and gas wells and sometimes as production tubing in depleted gas wells, which comes spooled on a large reel. Coiled tubing is often used to carry out operations similar to wirelining. The main benefits over wireline are the ability to pump chemicals through the coil and the ability to push it into the hole rather than relying on gravity. A coiled tubing operation is normally performed through the drilling derrick on the oil platform, which is used to support the surface equipment, although on platforms with no drilling facilities a self-supporting tower can be used instead. For coiled tubing operations on sub-sea wells a Mobile Offshore Drilling Unit (MODU) e.g. semi-submersible, drillship etc. has to be used to support all the surface equipment and personnel, whereas wireline can be carried out from a smaller and cheaper intervention vessel. Onshore, coiled tubing operations can be run using smaller service rigs, and for light operations a mobile self-contained coiled tubing rig can be used. Coil tubing can perform almost any operation for oil well operations if used correctly.

Coiled tubing can also be used for pumping and dispersing fluids to a specific location in the well, such as for cementing perforations, performing chemical washes, or fracturing formations. Coiled tubing umbilical technologies enable the deployment of complex pumps which require multiple fluid strings on coiled tubing. In many cases, the use of coiled tubing to deploy a complex pump can greatly reduce the cost of deployment by eliminating the number of units on site during the deployment.

One operation where coiled tubing is utilized is "Tracking" a well, a process which involves pumping large amounts of fluid, under high hydraulic pressure to fracture the oil or gas formation. Typically, hydrochloric acid (HCl) is one of the components of the frack fluid and the combination of acid and high temperature is highly corrosive to the system, one component of which is the coiled tubing. Internally and in most cases externally, coiled tubing is not protected against corrosion and is by its nature, highly susceptible to acid or hydrogen sulfide attack.

The electro-plasma process (EPP) disclosed herein and in U.S. Pat. No. 6,585,875, whose disclosures are expressly incorporated herein by reference, provide a means to protect the coiled tubing, both internally and externally by applying a single metal coating or layered coatings or alloy coatings. Additionally, because of the nature of the EPP, one type coating can be applied internally and another or different coating can be applied externally. Coiled tubing can be a small as from 0.50 inches in diameter up to 4 inches in diameter and roll formed from a single sheet of steel and continuously welded as forming occurs.

UK-A-1399710, U.S. Pat. No. 5,958,604, U.S. Pat. No. 5,981,084, U.S. Pat. No. 5,700,366 & U.S. Pat. No. 6,585,875B1. Electrical plasma processing [high voltage] operates in an electrical regime in which the current decreases or remains essentially the same as voltage is increased and are characterized by the formation of plasma at the onset of the unstable region and further characterized; "it should be clearly understood that the required bubble regime cannot be obtained with any arbitrary combination of variables, such as, gap, flow rate, electrolyte concentration, temperature and so forth".

UK-A-1399710 teaches that the gas film must be continuous and the electrical regime which describes the current as decreasing or remaining constant as voltage is increased described the "unstable regime" characterized as the descending half of the first current curve.

WO-A-97/35051 describes an electrolytic process for cleaning and coating electrically conducting surfaces in which the anode comprises a metal for metal coating of the surface of the workpiece. In WO-A-97/35051 and 35052 an arc discharge or electro-plasma is formed on the surface of the workpiece and is established within the bubble layer. If the anode is constructed from a non-inert material, such as a non-refractory metal, then metal atoms are transferred from the anode to the cathode. Coatings achieved by this regime, such as in WO-A-99/15714, are a special form of electroplating because they occur at high voltage in the presence of an arc discharge and the plating is faster than normal electroplating.

U.S. Pat. No. 4,360,410 describes the use of foam for an improved electroplating process. This is a typical electroplating process where low voltage is utilized for ion transfer, without discharge or plasma generation. It operates in a different electrical regime with is typical conventional electrolytic processing. One of the teachings of this patent is that foam improves the uniformity of application.

WO-A-98-32892 describes a process which operates essentially in the manner described in WO-A-99/15714 but uses a conductive gas/vapor mixture as the conductive medium. This gas/vapor mixture is generated within a multi-chambered area by passing electrolyte through holes in the anode. The gas/vapor mixture is generated by heating an aqueous electrolyte within the chamber to the boiling point and the anode chamber may be heated either by primary electrical current or by independent electrical heaters.

WO-01/09410 A1-U.S. Pat. No. 6,585,875 describes a process similar to WO-A-98/32892 & WO-A-99/15714 and claims an improved process in which an electro plasma (arc-discharge) is utilized to clean and/or apply a metal coating to an electrically conductive substrate.

U.S. Pat. No. 6,585,875 teaches an improved process in which arc-discharge electro-plasma is employed to clean and/or apply a metal coating to an electrically conductive surface, in which the electrically conductive pathway is provided by a foaming electrolyte which fills the space between the anode and cathode and provides advantages with respect to lower power consumption, more uniform surface treatment and greater latitude in the size of the gap between the anode and cathode, thereby allowing for more diverse workpieces. Importantly, while the present invention employs the electro-plasma process generally described in U.S. Pat. No. 6,585,875, the present invention provides for substantial advances in the cleaning and coating processes as applied to coiled tubing as further described herein.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements.

FIG. 1 shows a bottom view of a typical reactor used in the present invention and showing the workpiece as pipe.

FIG. 1A shows a bottom view of a typical reactor used in the present invention and showing the workpiece as strip metal.

FIG. 2 shows a bottom view of a typical reactor used in the present invention and showing the workpiece as wire rod, rebar, or tube.

FIG. 3 shows a side view of the reactor in the preceding figures.

FIG. 4 shows an end view of the reactor of FIG. 1.

FIG. 5 shows a cross sectional view of the reactor of FIG. 1 taken between adjacent reaction chambers.

FIG. 6 shows a cross sectional view of the reactor of FIG. 1 taken within a typical reaction chamber.

DETAILED DESCRIPTION OF THE INVENTION

Figure 7:
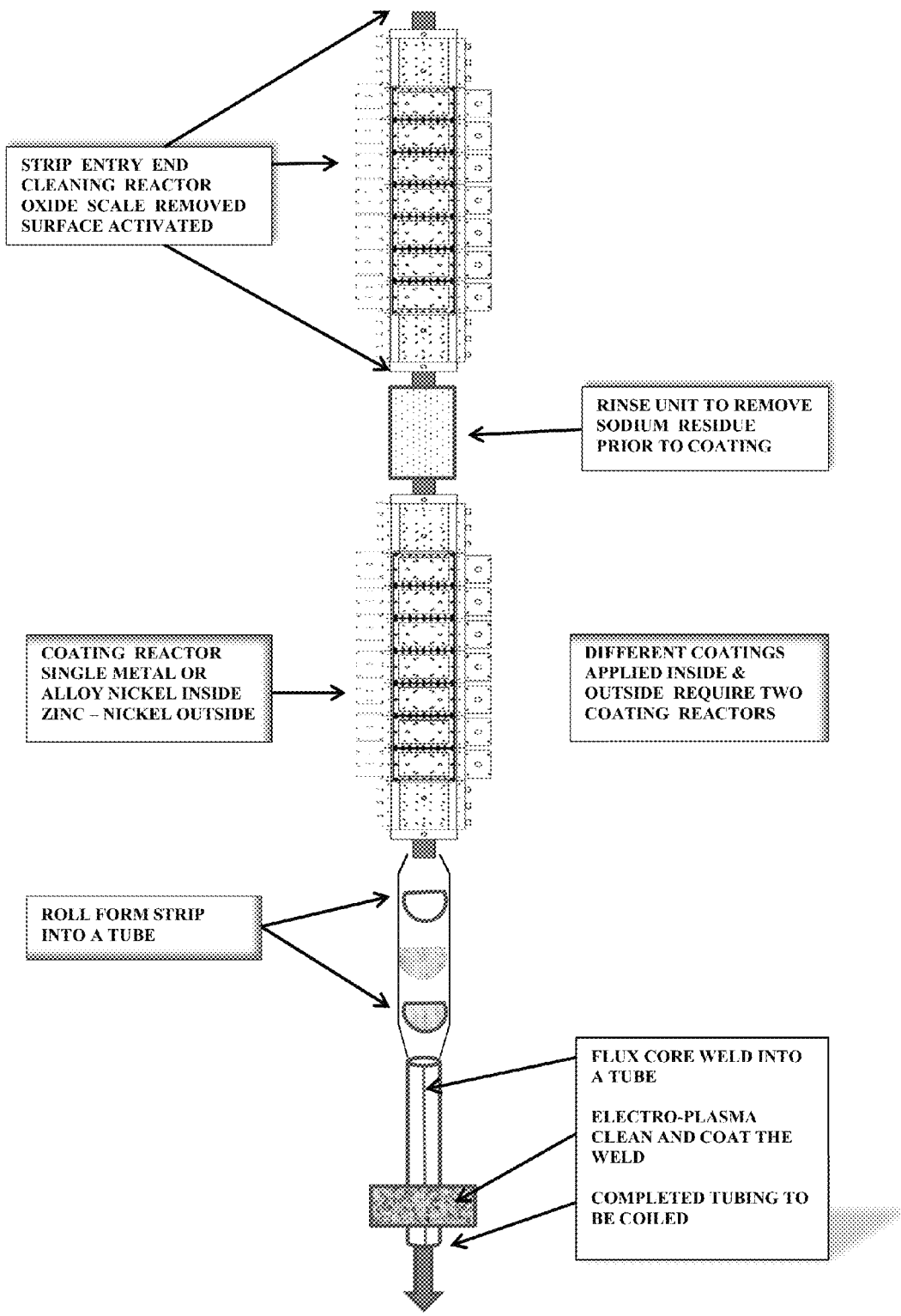
FIG. 7 shows the cleaning and coating of a metal workpiece prior to forming it into coiled tubing.

Before the subject invention is further described, it is to be understood that the invention is not limited to the particular embodiments of the invention described below, as variations of the particular embodiments may be made and still fall within the scope of the appended claims. It is also to be understood that the terminology employed is for the purpose of describing particular embodiments, and is not intended to be limiting. Instead, the scope of the present invention will be established by the appended claims.

In this specification and the appended claims, the singular forms "a," "an," and "the" include plural reference unless the context clearly dictates otherwise. Unless defined otherwise, all technical and scientific terms used herein have the same meaning as commonly understood to one of ordinary skill in the art to which this invention belongs.

Generally, the present invention provides for the cleaning and coating of steel sheet prior to roll forming and welding the sheet into a continuous tube. Once formed, the weld seam can be externally ground to the desired smoothness, and the weld seam of the newly formed tubing can be cleaned and coated. Finally, the completely coated tubing leaving the reactor can be immediately coiled. The internal weld bead is made from a corrosion resistant alloy and therefore not susceptible to corrosion internally, while the remainder of the internal surface is coated with a corrosion resistant coating.

Coiled tubing is a continuous string of tubing, rolled onto a spool. The tubing is made from rolling strip material into a tubular form and resistance welding along its length. The strip material is joined together using carefully controlled bias welding processes, such that the final tubing string has no visible butt welds. Upon its manufacturing, the tubing is rolled onto large spools with core diameters ranging from 8-12 feet.

The steel strip, whose width is determined by the final tube diameter to be created, is passed through an Electro Plasma Process (EPP) reactor for first removing any oxide scale or any other contaminants on the steel surface, both sides simultaneously, then within the same line subsequently applying a metal coating, layered metal coating, or an alloy coating. The EPP allows for one type of coating on a first side of the strip that will become the inside of the tube, while allowing for a different type of coating on the second side of the strip that will become the outside of the tube.

As the strip enters the EPP reactor, liquid electrolyte flows into one or more of the reaction chambers through holes in the anode from the top and bottom sides of the strip. A direct current (DC) electrical voltage is applied which can be from 30 VDC up to 160 VDC depending on the width of the strip to be processed. The electrically conductive electrolyte forms a foam which is comprised of a gas/vapor phase and a liquid phase which fills the entire reaction chamber. Operating parameters control the electro-plasma discharge which occurs at the near surface of the strip, sometimes referred to as the workpiece. In the case of cleaning, thermal shock, chemical reaction, electrical reaction, and kinetic energy in the form of cavitation remove all oxides present on the surface, and organic materials are reduced back to their elemental form due to the plasma generated heat. For coating, positively charged metal ions of the coating metal are attracted to the negative workpiece surface, but are blocked by the constant formation of evolving hydrogen bubbles. As the gas inside the bubbles reaches an electrical potential for ionization, the bubbles implode and accelerate the metal ions to the surface of the workpiece, which forms the coating.

Upon leaving the cleaning and coating sections of the reactor, the tube is formed and welded, and the newly created tube passes through a grinding station which removes any excess weld metal and causes the tube to have a smooth outer surface. Following the grinding operation, a small EPP unit applies a coating, matching the exterior coating applied to the tube which provides a uniform exterior coating over the entire surface of the tube.

The existing foam plasma reaction device requires numerous machined parts each requiring special rubber seals to maintain individual entry and exit chambers for the electrolyte and gas/vapor. For processing coiled tubing in a continuous state, the steel sheet is moved through a reaction zone, first for cleaning and in the second or third reactor for coating. With respect to coating, one type of coating can be applied on one side, while a second or different coating can be applied on the opposite side.

The ends of the workpiece chamber are sealed by use of mechanical seals which may or may not use air seals for additional sealing. The seals are made from polyamide with hard rubber bodies which seal against the work piece, top and bottom. These seals can also be used as drive mechanisms to move the steel sheet through the reactor or as a grounding mechanism when made from a conductive metal. The plasma process allows for greater control over the physical application of the plasma by creating the ability to apply plasma to a single spot, side, or predetermined area of a workpiece which is not possible with other plasma systems. In the case of coiled tubing, the plasma system described and illustrated herein can cover the entire workpiece, top and bottom, with plasma simultaneously. Using this system, the plasma process allows for the creation of portable units and enables easy processing of parts and pieces of materials.

A further embodiment of the process is the substantial reduction or elimination of waste metal used for coating. In the electro-plasma process (EPP), all metal in solution which is not plated onto the workpiece is recirculated through a regeneration system in which single metal ingots or multiple types of metal ingots are secured and thereby regenerating the plated metal ions back into the electrolyte solution. In the case where a metal is applied to one side of the workpiece and a different metal applied to the opposite side, multiple regeneration systems (tanks) are required for housing the metal ingots.

The following examples are illustrative of typical cleaning and coating parameters as applied to sample workpieces which would be formed into tubing.

EXAMPLE 1

A strip of low carbon steel 2' wide, 24" long and 4 mm thick was passed through a reactor for removing the oxide mill scale. The mill scale was removed and a matte gray finish remained. The cleaned steel strip was passed through a second reactor for zinc coating.

Cleaning:
Electrolyte Temperature: 78° C.
Electrolyte Concentration: 10% $NaHCO_3$ pH: 8.5
Electrolyte Flow Rate: 1.25 L/min nominal flow rate
Travel Speed: 1 fpm
Reactor Length: 66 cm
Plasma Zone [active length]: 52 cm
Voltage DC Range: 135 VDC-90 VDC
Amperage Range 34 A-18 A
Coating:
Electrolyte Temperature: 70° C.
Electrolyte Concentration: 14% $ZnSO_4$ pH: 4.3
Electrolyte Flow Rate: 1.75 L/min nominal flow rate
Dwell Time in Plasma: 24 seconds
Coating Thickness: 32 microns
Voltage DC Range: 125 VDC-140 VDC
Amperage Range: 38 A-48 A

EXAMPLE 2

A strip of low carbon steel 4" wide, 30" long and 3 mm thick was passed through a reactor for removing oxide mill scale. The scale was removed and a matte gray finish remained. The clean strip was viewed at 80× to determine if all the scale had been removed and viewing showed no scale remained. The cleaned strip was passed through a second (coating) reactor for zinc coating.

Cleaning:
Electrolyte Temperature: 68° C.
Electrolyte Concentration: 14% $NaHCO_3$ pH: 8.3
Dwell Time in Plasma: 28 seconds
Plasma Zone: 6 inches
Voltage DC Range: 170 VDC
Amperage Range: 45 A-65 A
Coating:
Electrolyte Temperature: 70° C.
Electrolyte Concentration: 14% Zn and 10% Ni, pH: 4.2
Dwell Time in Plasma: 40 seconds
Plasma Zone: 6 inches
Coating Thickness: 25-35 microns
Voltage DC Range: 160 VDC-190 VDC
Amperage Range: 50 A-77 A

EXAMPLE 3

Three samples of automobile sheet steel were used for testing. Specimens P1 and P2 were cleaned and coated with the EPP, and Specimen A3 was acquired with only a zinc layer. Multiple analytical methods were employed to determine the qualities of the cleaned and coated specimens: optical metallography, electron microscopy (SEM), X-ray structural analysis (XSA), and micro X-ray spectrum (MXSA).

Specimens P1 and P2 were processed with EPP for cleaning and coating utilizing standard EPP processing for temperature, electrolyte concentration and power densities, which for cleaning were in the range of 50-60 $W/cm^2$ and for coating the power density was in the range of 65-80 $W/cm^2$. Specimens P1 and P2 were analyzed with X-ray diffraction and a clear diffraction picture containing only peaks of α-iron and metallic zinc with no oxide. The zinc layer on Specimens P1 and P2 were 4 microns average, and on Specimen A3 the zinc layer was 3 microns on average. All specimens showed approximately 2-3 microns on the underside of the specimen.

Measurements taken at 10 points on each specimen, front side only, showed the following:

| P1 and P2 | Zinc 95.6 | Fe 4.4 |
| A3 | Zinc 95.8 | Fe 4.2 |

Cross sections of each specimen showed a very well adhered coating which followed precisely the contour of the base metal for specimens P1 & P2, while specimen A3 had a limited number of voids in areas of pockets in the base metal. The grain structure of Specimen A3 showed grain sizes from 80 to 200 microns, with the orientation perpendicular to the base metal and light and dark regions can be seen In the coating which was not seen in the coating on specimens P1 & P2. Grain size in Specimens P1 and P2 are approximately 40 to 120 micron, tightly packed with the orientation horizontal to the surface of the base metal. The data clearly shows that with EPP, no intermetallic is formed between the base metal and the coating and the zinc coating contains no oxides, only pure metallic zinc.

EXAMPLE 4

Three sets of high carbon steel specimens (strips), with three specimens per set were processed. All specimens were in the original state with oxide mill scale to be removed prior to coating with zinc. All specimens were 3"×18"×0.750"

Cleaning:
Electrolyte: 14% $NaHCO_3$ pH: 8.5 Conductivity: 62.4 mS@50° C.
Plasma Zone: 4" wide×2" long 38.71 sq. centimeters
First Set (1A, 1B and 1C), Second Set (2A, 2B and 2C), Third Set (3A, 3B and 3C)

| | |
|---|---|
| 1A | Volts 150 Amps 47 Gap 8 mm, Exit Temp: 220° F., Dwell Time 19 seconds |
| 1B | Volts 150 Amps 44 Gap 10 mm, Exit Temp: 225° F., Dwell Time: 23 seconds |
| 1C | Volts 140 Amps 48 Gap 12 mm, Exit Temp: 225° F., Dwell Time: 20 seconds |
| 2A | Volts 130 Amps 47 Gap: 10 mm, Exit Temp: 200° F., Dwell Time 13 seconds |

| | |
|---|---|
| 2B | Volts 130 Amps 46 Gap: 11 mm, Exit Temp: 200° F., Dwell Time: 10 seconds |
| 2C | Volts 125 Amps 41 Gap: 11 mm, Exit Temp: 210° F., Dwell Time: 8 seconds |
| 3A | Volts 125 Amps 47 Gap: 11 mm, Exit Temp: 200° F., Dwell Time: 15 seconds |
| 3B | Volts 130 Amps 45 Gap: 12 mm, Exit Temp: 200° F., Dwell Time: 14 seconds |
| 3C | Volts 130, Amps 48 Gap: 12 mm, Exit Temp: 200° F., Dwell Time: 13 seconds |

Based on the above results, higher flow rates create higher power densities and longer cleaning times while lower flow rates reduce power density and reduces cleaning times. The lowest power density, with the lowest flow rate produced the shortest dwell time to fully clean.

Coating:
Electrolyte: 10% Zn and 6% Ni
Temperature: 75° C.
Conductivity: 68.2 mS@50° C.
Flow Rate: 2.55 gpm
Dwell Time: 15 seconds Each set of three specimens were treated with the same parameters, except the gap which increased for each specimen.

| | |
|---|---|
| 1A | Volts 180 Amps 20 Dwell Time: 15 seconds Gap: 8 mm Coating: 8 microns |
| 1B | Volts 180 Amps 22 Dwell Time: 15 seconds Gap: 10 mm Coating: 13 microns |
| 1C | Volts 180 Amps 25 Dwell Time: 15 seconds Gap: 12 mm Coating: 14 microns |
| 2A | Volts 180 Amps 26 Dwell Time: 15 seconds Gap: 14 mm Coating: 20 microns |
| 2B | Volts 180 Amps 26 Dwell Time: 15 seconds Gap: 15 mm Coating: 23 microns |
| 2C | Volts 180 Amps 27 Dwell Time: 15 seconds Gap: 16 mm Coating: 23 microns |
| 3A | Volts 200 Amps 19 Dwell Time: 15 seconds Gap: 16 mm Coating: 11 microns |
| 3B | Volts 200 Amps 24 Dwell Time: 15 seconds Gap: 16 mm Coating: 23 microns |
| 3C | Volts 200 Amps 32 Dwell Time: 15 seconds Gap: 12 mm Coating: 36 micons |

Based on the above results, higher flow rates increase amperage and increases coating thickness. There is also a correlation between amperage and gap for creating thicker coating, however, flow, which controls amperage appears to be the most important contributor to thicker, denser coatings.

EXAMPLE 5

Three sets of carbon steel specimens were cleaned in four (4) tests by the EPP using the typical cleaning parameters. The specimens were then coated with zinc, plotting thickness in relation to flow rate, amperage, voltage and concentration:

Test One: Voltage 150V, Amps 16, Flow Rate 0.5 gpm, Dwell 12 seconds, Coating: 7 microns
Test Two: Voltage 180V, Amps 20, Flow Rate 0.75 gpm, Dwell 12 seconds, Coating: 15 microns
Test Three: Voltage 200V, Amps 24, Flow Rate 1.0 gpm, Dwell 12 seconds, Coating: 30 microns
Test Four: Voltage 220V, Amps 30, Flow Rate 1.25 gpm, Dwell 12 seconds, Coating: 35 microns In each test the concentration of $ZnSO_4$ was increased, starting at 1.75 lbs per 1 gallon of water and increased ¼ lb. per test with the final test being 2.50 lbs/gal $H_2O$. Flow, which controls amperage appears to be the most significant factor for applying thicker coatings.

The process described herein further includes steps wherein the positive ions include one or a multiple of species of positive ions that form a coating of a single metal or layers of metals or alloys of metals. The process further includes steps wherein the positive ions are derived from one or multiple sacrificial anodes.

The process may include steps wherein the electrolyte is heated.

The process may further includes steps wherein heated aqueous electrolyte is introduced into a reaction chamber and becomes foam as the electrical current is applied between the anode and cathode causing ebullition at the cathode.

The process may further includes steps wherein the electrically conductive medium can be assisted by foaming agents, surfactants or mixtures of the electrically conductive medium and other agents. Furthermore, the process may further includes steps wherein the reaction which takes place within the reactor chamber comprises thermal, electrical, chemical and kinetic means for the removal of oxide mill scale, thermal oxide scale, lubricants, metals, dirt and other organic matter.

The process may further includes steps wherein the cleaned metal surface exhibits a surface morphology consisting of craters and spheroids, which exposes a large surface area that is similar to zinc phosphate crystals used to carry lubricant for drawing.

The process may further includes steps wherein the cleaned surface is passivated against corrosion when: (1) oxide mill scale is removed, the FeO layer is re-constituted into alpha (amorphous) iron, and (2) the near surface grain size is substantially reduced to nano-sized grains that are tightly packed against one another reducing the ability for corrosives to penetrate.

The process may further includes steps wherein the deposition of metal ions, single metals, layers of metals or alloys of metals do not cause the initiation or growth of an intermetallic layer which forms between the substrate metal and the coating metal in conventional hot dip processes.

The process may further includes steps wherein the deposition of metal ions, single metals, layers or metals or alloys of metals do not cause or create the phase diffusion boundary layer which exist in conventional electroplating.

The process may further includes steps wherein the deposition of metal ions to form a coating on the cathode does not cause hydrogen embrittlement as does conventional hot dip coatings or electroplating processes.

The process may further includes steps wherein the temperature of the core of the workpiece is controlled to be maintained at or below 950 C to control the dissociation process of oxygen and hydrogen and to subdue the formation of oxygen bubbles which block and inhibit the formation of hydrogen bubbles which are the essence of the process of glow discharge plasma.

The process may further includes steps wherein the effects of magnetism and electrical fields (magneto hydrodynamics) created with the plasma zone causes formation of a downward pressure which forces the metal crystals being formed from deposition to form in a plane which is parallel to the surface of the workpiece (cathode), which is opposite from conventional hot dip processes and electroplating.

The process may further includes steps wherein the reactor includes a single chamber or multiple chambers separated by a guide system which blocks the free movement of electrolyte between the chambers in which one or more electrically conductive plates perforated with multiple holes with a diameter from 0.5 mm to 2.5 mm in diameter which allows electrolyte to flow into the reaction zone and contact the workpiece (cathode) which forms the electrical path between the anode and cathode, and which aqueous electrolyte forms the foam for initiation of the electro-plasma process.

The process may further includes steps wherein the reactor further comprises exhaust ports substantially above the elevation of the workpiece to allow for expanding gas to be vented from the reaction zone, and a method to allow movement of the workpiece through the reaction zone.

We claim:

1. A method for creating an improved coiled tubing, comprising:
   (a) cleaning a sheet metal workpiece using an electroplasma process to remove oxide scale and other contaminants on surfaces of the workpiece;
   (b) applying a first metal coating to the workpiece using the electroplasma process;
   (c) forming the sheet metal workpiece into a tube having abutting edges to form a seam;
   (d) welding the seam to complete the formation of the tube;
   (e) grinding the seam to establish a smooth exterior surface on the seam;
   (f) applying a second metal coating to the seam of the tube using the electroplasma process; and
   (g) coiling the tube around a spool.

2. The method of claim 1, wherein the electroplasma process comprises:
   (a) placing the sheet metal workpiece within a reaction chamber, wherein the reaction chamber includes an anode, and wherein the workpiece is a cathode;
   (b) creating a gap between the anode and the workpiece, wherein the anode includes a plurality of orifices;
   (c) applying an aqueous electrolyte into the reaction chamber through the orifices in the anode and onto the workpiece, and applying the aqueous electrolyte from below the workpiece, to establish an electrically conductive medium around the workpiece;
   (d) applying a DC voltage to the electrically conductive medium in excess of 30 VDC, such that a foam is formed within the reaction chamber, wherein the foam comprises a gas/vapor phase and a liquid phase which fills the entire reaction chamber;
   (e) adjusting the voltage to establish an electroplasma discharge between the anode and the workpiece sufficient to cause positive ions in the electrically conductive medium to become concentrated near the surface of the workpiece and cause micro-zonal melting of the surface in the area of discreet plasma bubbles; and
   (f) moving the workpiece through the reaction chamber and away from the electrically conductive medium to allow re-freezing of the molten surface of the workpiece.

* * * * *